US010534769B2

(12) United States Patent
Bacalzo et al.

(10) Patent No.: US 10,534,769 B2
(45) Date of Patent: Jan. 14, 2020

(54) MAINTAINING CONSISTENCY BETWEEN A TRANSACTIONAL DATABASE SYSTEM AND A NON-TRANSACTIONAL CONTENT REPOSITORY FOR DOCUMENT OBJECTS

(71) Applicant: International Business Machines Corporation, Armonk, NY (US)

(72) Inventors: Roger G. Bacalzo, Kirkland, WA (US); Robert M. Kreuch, Kirkland, WA (US); Michael R. C. Seaman, Impington (GB)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 15/191,292

(22) Filed: Jun. 23, 2016

(65) Prior Publication Data

US 2016/0328438 A1 Nov. 10, 2016

Related U.S. Application Data

(63) Continuation of application No. 14/703,468, filed on May 4, 2015, now Pat. No. 9,922,070.

(51) Int. Cl.
*G06F 17/00* (2019.01)
*G06F 16/23* (2019.01)

(52) U.S. Cl.
CPC ...... *G06F 16/2365* (2019.01); *G06F 16/2343* (2019.01)

(58) Field of Classification Search
CPC ......... G06F 17/30371; G06F 17/30362; G06F 17/30; G06F 16/2365; G06F 16/2343

USPC .................................................. 707/600–899
See application file for complete search history.

(56) References Cited

U.S. PATENT DOCUMENTS

| 8,863,297 B2 | 10/2014 | Sharma et al. | |
| 2009/0327288 A1* | 12/2009 | Silverman | G06F 17/30038 |
| 2011/0276863 A1* | 11/2011 | Bhise | G06F 21/10 |
| | | | 715/201 |
| 2012/0030180 A1 | 2/2012 | Klevenz et al. | |
| 2013/0050744 A1* | 2/2013 | Cok | H04N 1/00167 |
| | | | 358/1.15 |

(Continued)

OTHER PUBLICATIONS

International Business Machines Corporation, "List of IBM Patents or Patent Applications Treated as Related," Jun. 24, 2016, 2 pages.

*Primary Examiner* — Isaac M Woo
(74) *Attorney, Agent, or Firm* — Patterson + Sheridan, LLP

(57) ABSTRACT

The present disclosure relates to maintaining consistency in a content management system. A content management system generally includes a transactional database for storing content metadata and a non-transactional data repository for storing content. According to one embodiment, a content management system generates a set of content identifiers. The content management system receives a request to upload content to the content management system. Upon receiving the request, the content management system associates the content with a content identifier from the set of content identifiers and generates a name for the content from the content identifier. The content management system stores the content, with the generated name, in a non-transactional data repository and persists metadata related to the content in a transactional data store.

7 Claims, 6 Drawing Sheets

(56) References Cited

U.S. PATENT DOCUMENTS

2013/0145367 A1 6/2013 Moss et al.
2013/0332421 A1 12/2013 Bader et al.
2015/0067479 A1 3/2015 La Fontaine et al.
2016/0328437 A1 11/2016 Bacalzo et al.

* cited by examiner

MAINTAINING CONSISTENCY BETWEEN A TRANSACTIONAL DATABASE SYSTEM AND A NON-TRANSACTIONAL CONTENT REPOSITORY FOR DOCUMENT OBJECTS

This application is a continuation of co-pending U.S. patent application Ser. No. 14/703,468, filed May 4, 2015. The aforementioned related patent application is herein incorporated by reference in its entirety.

BACKGROUND

The present disclosure relates to content management systems, and more specifically, to maintaining consistency between a transactional database and a non-transactional data repository content repository in a content management system (e.g., during document persistence).

Content management systems store metadata related to content (e.g., title, document author, file type, status (e.g., checked out to a particular user, read-only, etc.), version information, customized information, etc.) in a transactional database system and the actual content in a non-transactional data repository (e.g., a network drive). A content management system allows for document persistence. That is, users may add new content to the content management system and, under certain conditions, change existing content (e.g., add or remove data). In adding new content to a content management system or modifying existing content stored in a content management system, the content management system generally adds and/or modifies metadata associated with the new or modified content to the transactional database.

Transaction management is typically performed for the transactional database system; however, transaction management may not monitor the non-transactional data repository. Because transaction management may not operate across both a transactional database system and a non-transactional data repository, the content management system typically maintains consistency between metadata (stored in the transactional database) and stored in the non-transactional data repository). When the content management system fails to persist metadata associated with content (e.g., a document object) to the transactional database (i.e., commits a database transaction for storing the metadata) or fails to persist content to the non-transactional data repository (i.e., writes the content to the non-transactional data repository and synchronizes the content to the content repository), an inconsistency is generated in the content management system. For example, if meta-data is persisted to the transactional database, but the associated content is not persisted to the non-transactional data repository, the content management system may associate a metadata entry with non-existent content. Similarly, if content is persisted to the non-transactional data repository but the associated metadata is not persisted to the transaction database, the content may not be accessible through the content management system. In either case, inconsistencies between the transactional database and the non-transactional data repository may result in wasted resources (e.g., database entries not associated with content or inaccessible content).

Typically, a content management system may accept some level of inconsistency between the transactional database and the non-transactional data repository or perform computationally expensive operations to maintain consistency within the content management system. If the content management system is configured to accept some level of inconsistency, content not associated with metadata in the content management system may remain in the non-transactional data repository, which wastes storage space and may be problematic, for example, in litigation. If a content management system is configured to maintain consistency, the content management system can perform document persistence in multiple phases involving writing content to a temporary location or use resource and transaction managers and transaction logging to manage content.

As a result, content management systems may not be resource efficient. This may result in increased costs for implementing and maintaining content management systems due to increased storage requirements, increased processing capability requirements, and so on.

SUMMARY

One embodiment disclosed herein includes a method for maintaining consistency in a content management system. This method may generally include generating a set of content identifiers. A request to upload a document object to the content management system is received. The document object is associated with a content identifier from the set of content identifiers. A name is generated for the content from the content identifier. The content is stored in a non-transactional data repository with the generated name. Metadata related to the content is persisted in a transactional data store.

Another embodiment includes a computer-readable storage medium having instructions, which, when executed on a processor, performs an operation for maintaining consistency in a content management system. The operation generally includes generating a set of content identifiers. A request to upload a document object to the content management system is received. The content is associated with a content identifier from the set of content identifiers. A name is generated for the content from the content identifier. The content is stored in a non-transactional data repository with the generated name. Metadata related to the content is persisted in a transactional data store.

Still another embodiment includes a processor and a memory storing a program, which, when executed on the processor, performs an operation for maintaining consistency in a content management system. The operation generally includes generating a set of content identifiers. A request to upload a document object to the content management system is received. The content is associated with a content identifier from the set of content identifiers. A name is generated for the content from the content identifier. The content is stored in a non-transactional data repository with the generated name. Metadata related to the content is persisted in a transactional data store.

DETAILED DESCRIPTION

Embodiments presented herein describe techniques for maintaining consistency between metadata stored in a transactional database and content stored in a non-transactional data repository of a content management system. Maintaining consistency in a document management system generally includes ensuring that content stored in a non-transitory data store is referenced by an entry in a database and that entries in a database do not reference content that does not exist in the data repository. Maintaining consistency in a content management system reduces resources allocated to unreferenced content and minimizes content retrieval errors (e.g., caused by metadata in a transactional database referencing non-existent content).

In one embodiment, a content management system generates a set of identifiers stored in a transactional database. The set of identifiers may be associated with an expiration time. When a user uploads new or modified content to the content management system, the content management system can associate one of the pre-generated identifiers with document metadata, which is committed to the transactional database. The content management system attempts to persist the content associated with the committed metadata to the non-transactional data repository.

Once the set of identifiers expires, the content management system evaluates each identifier for an association with persisted content. If a given identifier is not associated with persisted content, the content management system removes the identifier from the system. In one embodiment, the content management system derives a content name from a content identifier and searches for the named content in the non-transactional data repository. That is, content may be named based on the content identifier associated with the content. When the content management system searches for content associated with a content identifier in the non-transactional data repository, the content management system may derive the name of the content from the content identifier and search for content matching the derived content name. If the content management system finds content with the derived content name but does not find metadata associated with the content in the transactional database, the content management system may delete the content from the non-transactional data repository.

Advantageously, using content identifiers with an associated expiry time and using a back-out procedure to remove unused content identifiers and unreferenced content reduces storage costs resulting from unreferenced content in the non-transactional data repository and reductions in processing overhead from consistency management procedures. Additionally, eliminating finalization operations allows content persisted to a content management system to be accessible when document metadata is persisted to a transactional database.

Figure 1:
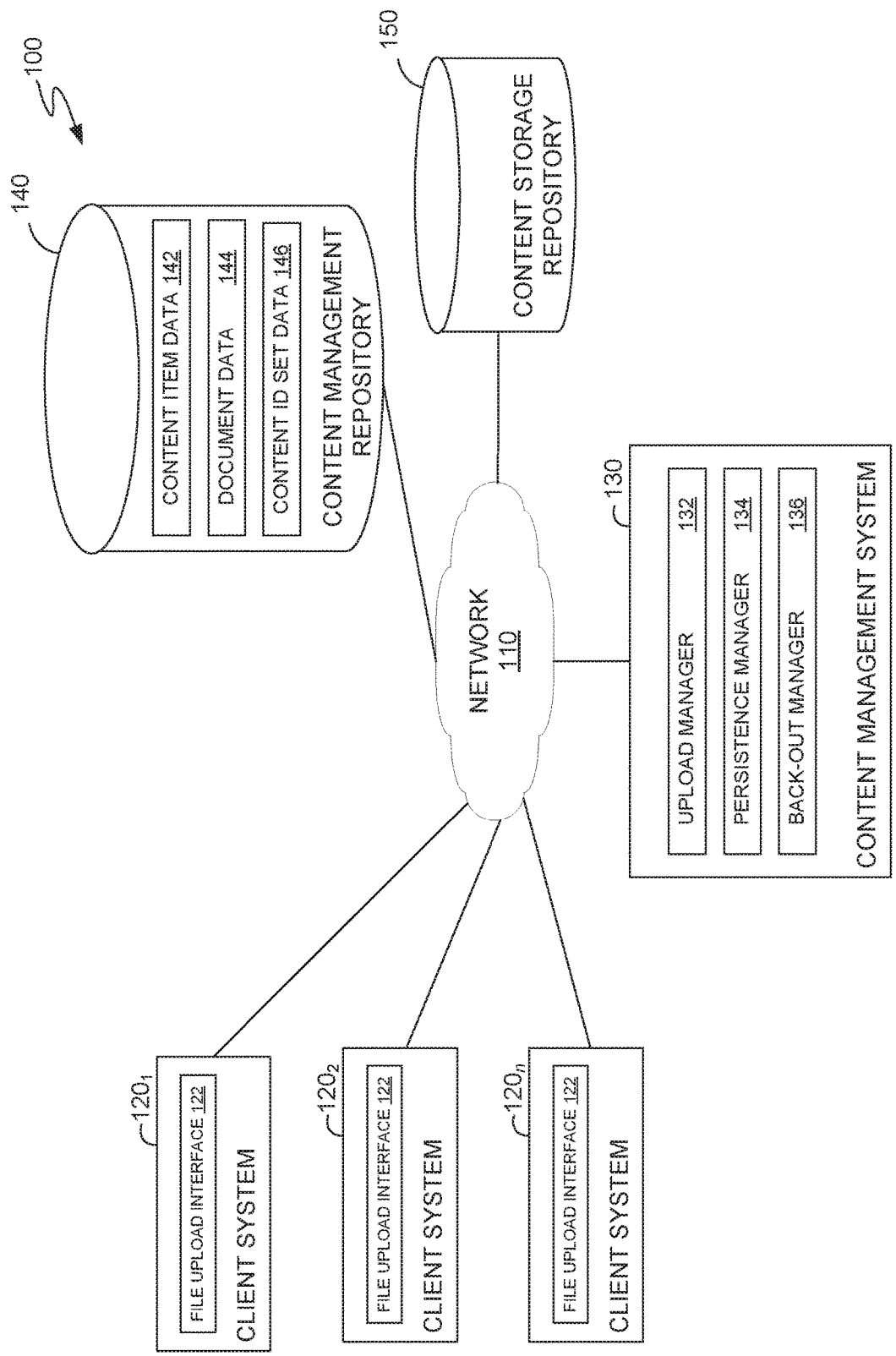
FIG. 1 illustrates an example of a networked computing environment, according to one embodiment.

FIG. 1 illustrates an example computing environment 100, according to one embodiment. As shown, the computing environment includes a plurality of client systems 120, a content management system 130, a content management repository 140, and a content storage repository 150, connected to a network 110.

Each client system 120 allows a user to access and/or modify existing content managed by a content management system 130 and add new content to the content management system 130. Each client system 120 includes a file upload interface 122. File upload interface 122 provides a mechanism for users to access content management system 130 to upload new or modified content to the content management system. Client systems 120 may upload content to content management system 130 using an application programming interface (API) associated with the content management system or using a thin interface, such as Simple Object Access Protocol (SOAP) requests over a Representational State Transfer (REST) interface.

As illustrated, content management system 130 includes an upload manager 132, a persistence manager 134, and a back-out manager 136. Upload manager 132 is generally configured to generate a set of unique identifiers associated with an expiry time, and receive a request from a client system 120 to add a document to content management system 130 or modify an existing document managed by content management system 130. For example, upload manager 132 may attempt to obtain a unique identifier from a content management repository 140 to be used in a file upload process. If content management repository 140 does not contain any unique identifiers, upload manager 132 may generate a set of unique identifiers based on information such as a system identification (e.g., a unique server name), a timestamp, or some other data that can be used to generate identifiers unique in the scope of the content management system (e.g., to a particular server used in the content management system). The content management system also generates an expiry time for the set of identifiers, which identifies a deadline for when content uploads associated with one of the identifiers are to be completed. Upload manager 132 may then persist the generated set of unique identifiers to content management repository 140 (e.g., to content identifier set data store 146) and select one of the unique identifiers to be used in a file upload process.

In some cases, sets of unique identifiers may expire before the content management system uses an identifier from the set for document ingestion. To optimize processing, the content management system may delete unused identifiers from the transactional database (e.g., content identifier set data store 146) before back-out manager 136 processes the set. In some cases, the content management system may associate each identifier in a set with a flag indicating whether or not the upload manager 132 used the identifier in a document management operation (e.g., adding a new document or modifying an existing document). When a set of unique identifiers expires, the content management system may examine the flags. Identifiers associated with a "not used" flag may be deleted without further processing at expiry, while identifiers associated with a "used" flag may be processed by back-out manager 136.

When upload manager 132 obtains a content identifier, upload manager 132 creates content in content storage repository 150. The name of the content may be generated based on the content identifier. For example, the name of the content may be derived from the content identifier. Additional information that applies generally to the non-transactional data repository (e.g., root path to a file system), however, need not be generated from a content identifier. By naming the content based on a content identifier, the back-out manager can locate a content item, as further discussed below.

After upload manager 132 uploads content to the non-transactional data repository, persistence manager 134 persists metadata associated with the content to the content management repository 140, which results in a document with metadata and content stored in the content management system. In one embodiment, persistence manager 134 inserts or updates rows in a document data store and inserts rows into a content item data store, as further described below.

Inconsistencies in the content management system may result from a failure to successfully upload content to the content management system or persist metadata to content management repository 140. For example, content stored in content storage repository 150 may be unreferenced if persistence manager 134 fails to successfully persist metadata associated with the content to content management repository 140 (e.g., to content item data store 142 or document data store 144), or if upload manager 132 fails to completely upload content to content storage repository 150. When the content management system 130 reaches an expiry time associated with a set of content identifiers, back-out manager 136 examines expired sets of unique content identifiers and perform clean-up operations to maintain consistency in the content management system.

Back-out manager 136 may obtain a set of content identifiers from content management repository 140 (e.g., from content ID set data store 146). To prevent long-running content uploads from increasing an expiration time during the back-out operation, back-out manager 136 may lock the expiry time associated with the set of content identifiers. For example, after obtaining a set of content identifiers, back-out manager 136 may set the expiry time associated with the set of content identifiers to a reserved value (e.g., NULL), which indicates to any ongoing content upload operations that the expiration time on the content identifier set may not be extended.

In some cases, where multiple instances of content management system 130 are running in computing environment 100, interlocks may be used to prevent multiple instances of the content management system from simultaneously processing the same set of content identifiers. For example, an instance of content management system 130 may obtain a lease on the set of unique identifiers. The lease identifies the earliest time when the set of unique identifiers may be obtained from the database. When a back-out manager 136 of an instance of content management system 130 obtains a lease on a set of unique identifiers (i.e., a set associated with a lease time earlier than the present time), back-out manager 136 may set the lease time associated with the set of unique identifiers to a future time. Back-out manager 136 may process the set of unique identifiers until the lease ends. If back-out manager 136 has not completed processing the set of unique identifiers when the lease time ends, back-out manager 136 may re-obtain a lease on the set of unique identifiers.

When back-out manager 136 obtains a set of unique identifiers from content management repository 140 (e.g., from content ID set data store 146), back-out manager 136 processes each content identifier in the set to determine if the content identifier is associated with content stored in content storage repository 150 and document metadata stored in content management repository 140. For example, to determine if a content identifier is associated with content and metadata, back-out manager 136 may execute a query against a content item data store to determine whether a content identifier was allocated for use in a document upload procedure. If the content identifier was not found, back-out manager 136 may determine that the file upload and/or metadata persistence procedure failed. The back-out manager may compute a name of the content from the unique identifier. Back-out manager 136 may then search for content with the computed name in content storage repository 150. If back-out manager 136 finds matching content, the back-out manager deletes the content from content storage repository 150.

After back-out manager 136 processes the set of unique content identifiers, the set of content identifiers may be deleted from content management repository 140. After a back-out procedure is completed for a set of expired content identifiers, the content identifiers in the set are either referenced by the content management system and are associated with content in content storage repository 150, or are not referenced in the content management system.

Content management repository 140 may be a transactional database and contain information used in a content management system. Content management repository 140 may include a content item store 142, a document data store 144, and a content ID set data store 146. As discussed above, content item store 142 may store content identifiers used by content management system 130 for content upload operations. Content management system 130 may add a content identifier to content item store 142 each time content is uploaded to the content management system. If content management system 130 determines, during back-out operations, that the content management system allocated a content identifier for a content upload process but the content does not exist in the content management system (e.g., metadata stored in content management repository 140 is not associated with the content identifier, or content named based on the content identifier is not found in content data repository 150), the content management system may remote the content identifier from content item store 142.

Document data store 144 may store metadata related to uploaded content. For example, an entry in document data store 144 may include a document identifier, a content (e.g., document object) name, creation and/or modification times, document owner information, a content identifier associated with the content, and so on. In some cases, when content management system 130 determines during back-out operations that metadata references non-existent content, the metadata may be removed from document data store 144 to maintain consistency in the content management system.

Content ID set data store 146 may include a set identifier, an expiry time associated with a set of content identifiers, and the set of content identifiers. As discussed above, each instance of a content management system 130 may generate a set of unique identifiers and store the set in content ID set data store 146. As client devices 120 perform upload operations to content management system 130, the content management system may choose an identifier from the set of unique identifiers and associate the chosen identifier with content to be uploaded to content storage repository 150 and metadata related to the content stored in content management repository 140. When a set of unique identifiers expires, content management system 130 may perform back-out operations to remove content identifiers, metadata, and/or content that is not referenced in content management system 130 (e.g., due to content persistence failures or metadata persistence failures).

Content data repository 150 may be a non-transactional data store. As described above, content management system 130 may upload content to content data repository 150 and associate uploaded content to metadata stored in content management repository 140. Content management system 130 may also, as sets of unique content identifiers expire, perform back-out operations to maintain consistency within the content management system. During back-out operations, content management system 130 may delete content that is not referenced by metadata in content management repository 140 (e.g., stored in document data store 144) from content data repository 150.

Figure 2:
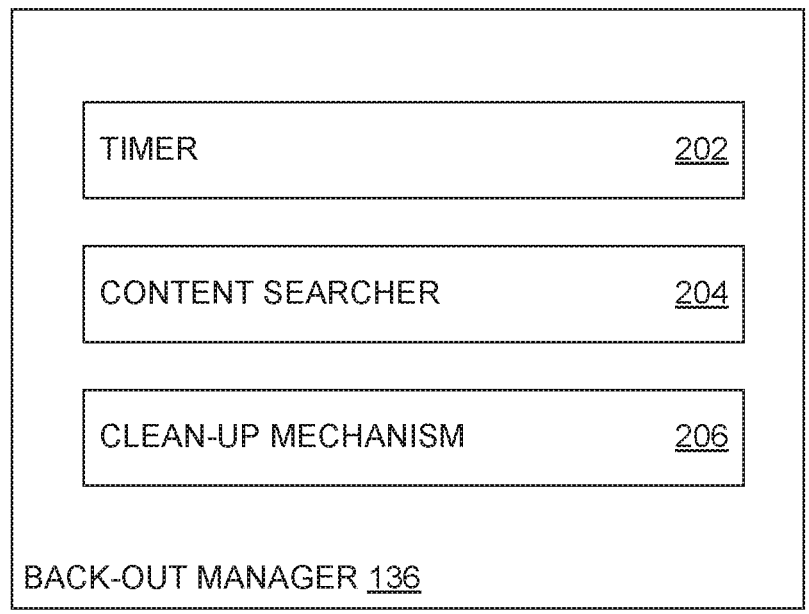
FIG. 2 illustrates a block diagram of an example back-out manager, according to one embodiment.

FIG. 2 illustrates an example block diagram of a back-out manager 136, according to some embodiments. As illustrated, back-out manager 136 includes a timer 202, a content searcher 204, and a clean-up mechanism 206. Timer 202 may interface with content management repository 140 to monitor sets of unique identifiers stored in content ID set data store 146. When timer 202 determines that a set of unique identifiers expires, the timer may prompt content searcher 204 to search for inconsistencies in content management system 130.

Content searcher 204 may be configured to determine whether a content identifier was used in document upload processes. If a content identifier was not used in a document upload process, content searcher 204 may determine that the content identifier can be deleted from content ID set data store 146 without further processing. If, however, a content identifier was used in a document upload process (i.e., content searcher 204 found the content identifier in content item data store 142), content searcher 204 may proceed to search for content in content data repository 150 and a metadata entry in document data store 144 based on the content identifier. If content searcher 204 does not find matching content in content data repository 150, the content searcher may determine that the document upload procedure failed. In response, content searcher may determine that the content identifier should be deleted from content management repository 140, and content associated with the content identifier (if any) should be deleted from content data repository 150. If content searcher 204 finds matching content in content data repository 150 but does not find matching metadata in document data store 144, the content searcher may determine that the content is unreferenced by the content management system 130 and should be deleted.

After content searcher 204 determines that content should be deleted, clean-up mechanism 206 deletes the content flagged for removal. Clean-up mechanism 206 may transmit deletion queries, for example, to content management repository to remove content identifiers from content item data store 142. Clean-up mechanism 206 also manages content stored in content data repository 150. If content searcher 204 determines that particular content should be deleted, clean-up mechanism 206 may perform file operations on content data repository 150 to delete the content and make the space available for other file operations (e.g., subsequent content uploads through content management system 130).

Figure 3:
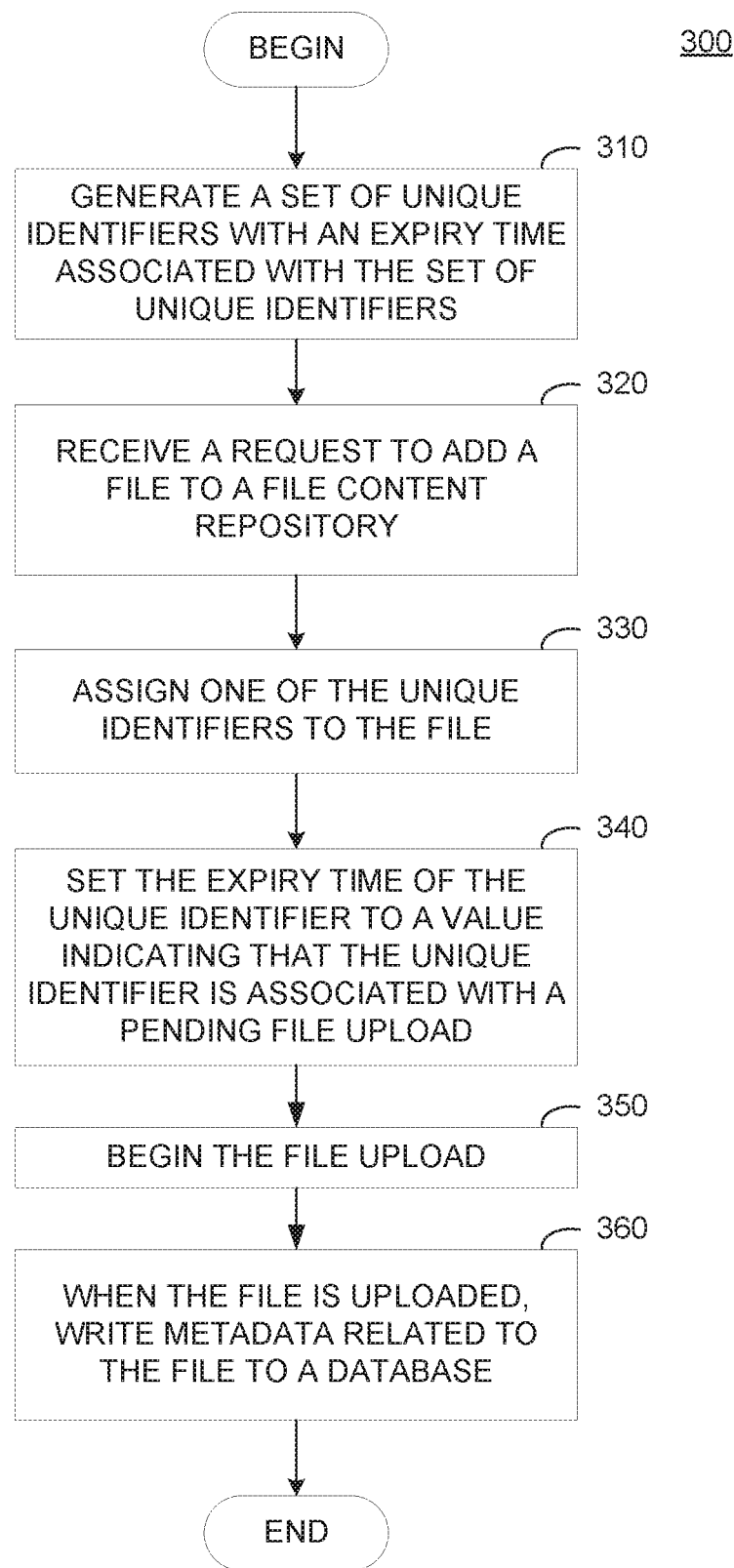
FIG. 3 illustrates a method for uploading content and metadata to a content management system, according to one embodiment.

FIG. 3 illustrates a method 300 to generate a set of unique identifiers for content ingestion procedures, according to one embodiment. As shown, method 300 begins at step 310, where the content management system generates a set of unique identifiers with an expiry time associated with the set of unique identifiers. For example, as discussed above, the content management system can generate a set of unique identifiers associated with a particular instance of the content management system. If multiple content management systems use the same content management repository, the sets of unique identifiers generated by each content management system may differ between the different content management systems.

At step 320, the content management system receives a request from a client system to add a file to a file content repository. The content management system may receive the request as via SOAP requests over a REST interface, or using an API of the content management system. The content management system may proceed to step 330, where the content management system assigns one of the unique identifiers to the file to be uploaded to the content management system. At step 340, the content management sets the expiry time of the unique identifier to a value indicating that the unique identifier is associated with a pending file upload. For example, as described above, the expiry time may be set to NULL or may be extended beyond the original expiry time associated with the set of unique identifiers. At step 350, the content management system begins the file upload. The content management system may upload the file to content data store 150 and assign the uploaded file a name based on the content identifier, as described above. At step 360, when the file is uploaded, the content management system writes metadata related to the file to a database. As described above, the content management system may write metadata to a database table that associates a content identifier to the metadata.

Figure 4:
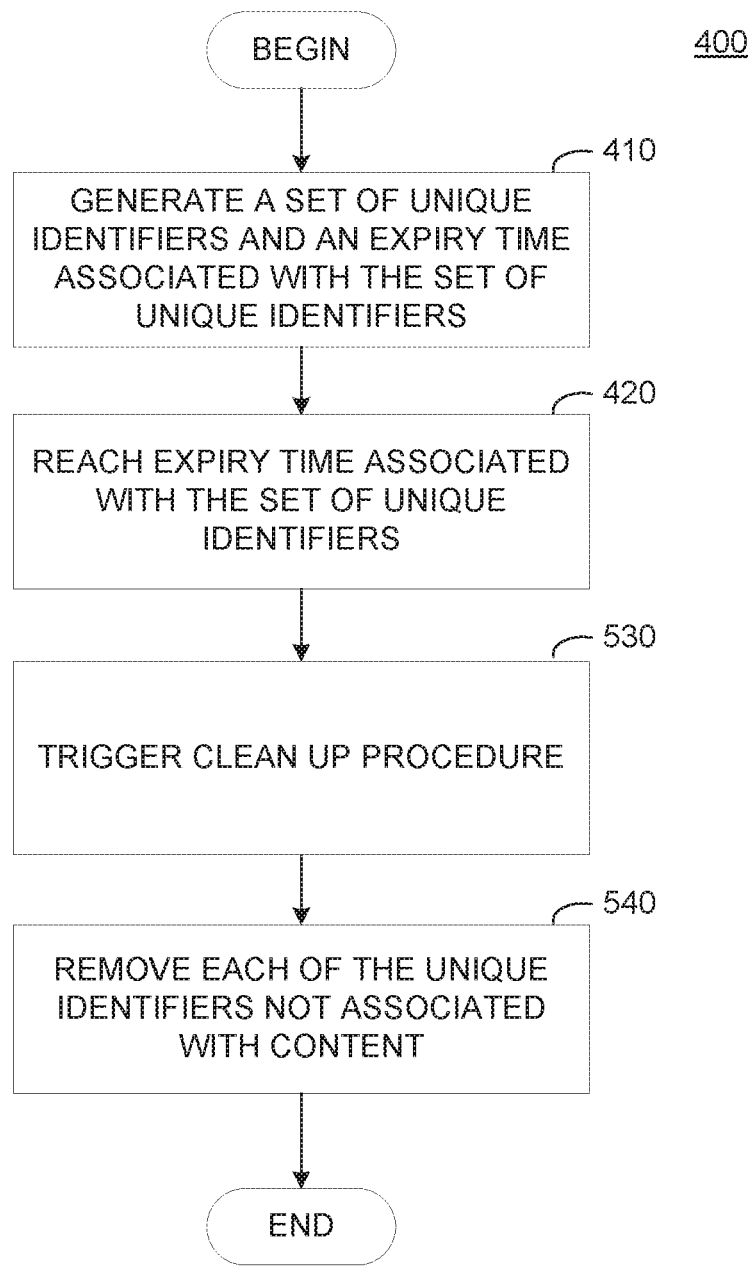
FIG. 4 illustrates a method for removing content identifiers in a content management system, according to one embodiment.

FIG. 4 illustrates a method 400 to remove unused content identifiers from the content management system, according to some embodiments. As shown, method 400 begins at step 410, where the content management system generates a set of unique identifiers and an expiry time associated with the set of unique identifiers. At step 420, the content management system reaches the expiry time associated with the set of unique identifiers. At step 430, the content management system triggers a clean-up procedure. As discussed above, the content management system may trigger a clean-up procedure by using, for example, a timer that triggers the clean-up procedure when the timer expires. The content management system may also trigger clean-up procedures by periodically checking an expiry time associated with a set of content identifiers against the current time (e.g., based on the content management system's internal clock). At step 440, the content management system examines the set of unique identifiers to determine which identifiers were allocated for content upload procedures and which identifiers were unused (i.e., not associated or potentially associated with content uploaded to the content management system). The content management system may delete unused identifiers and leave the allocated identifiers for further processing (e.g., by back-out manager 136, as described above).

Figure 5:
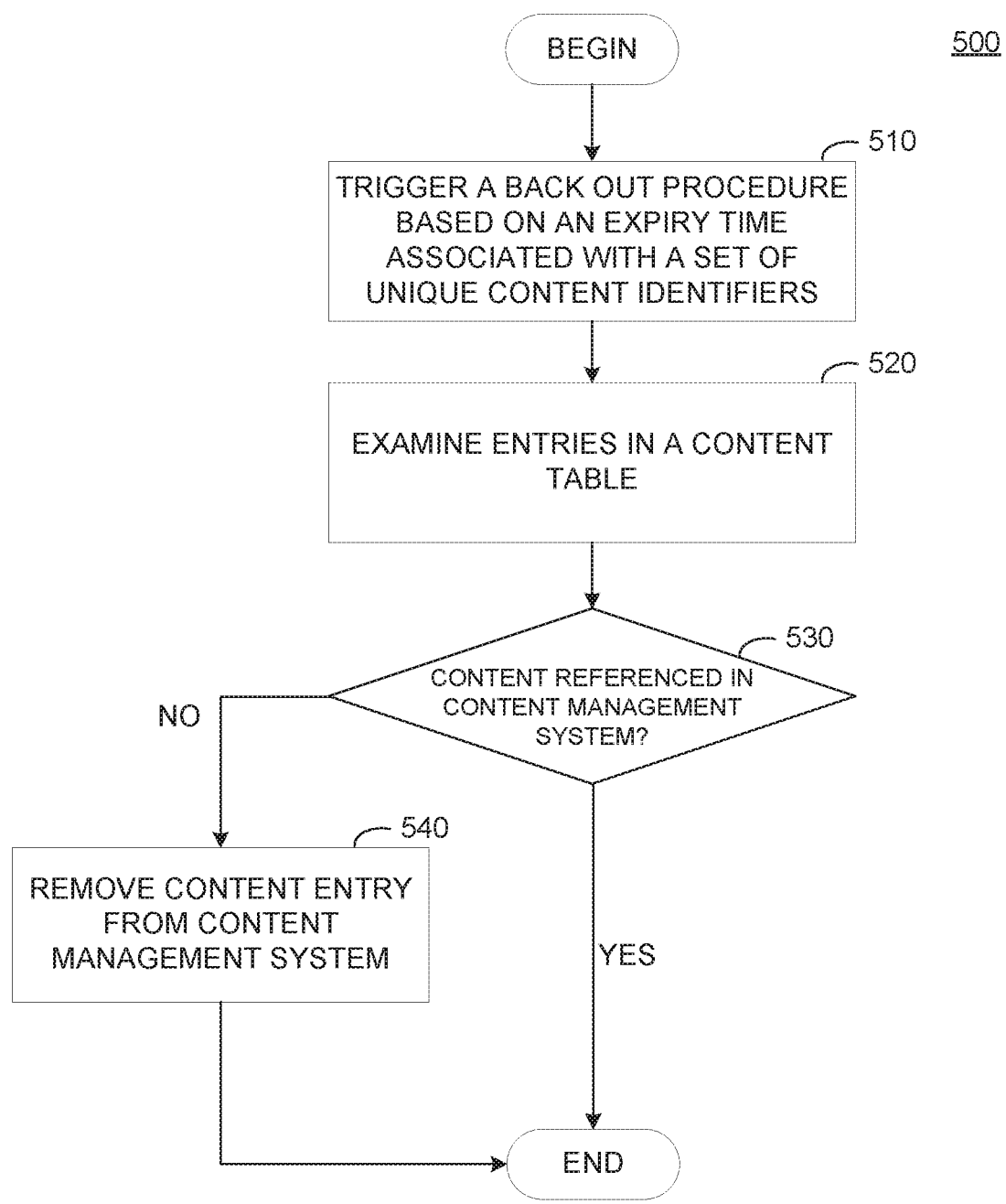
FIG. 5 illustrates a method for triggering a back-out procedure to maintain consistency in a content management system, according to one embodiment.

FIG. 5 illustrates a method 500 to enforce consistency between a transactional database used for storing document metadata and a document repository, according to some embodiments. As shown, method 500 begins at step 510, where the content management system triggers a back-out procedure based on an expiry time associated with a set of unique content identifiers. As described above, the content management system may trigger a back-out procedure based on a comparison of the current system clock to an expiry time associated with a set of content identifiers. At step 520, the content management system examines entries in a content table. The entries in the content table may represent, for example, allocations of unique identifiers used (or potentially used) for document upload procedures.

At step 530, the content management system determines whether content associated with the unique identifier is referenced in the content management system. For example, the content management system may search for content in content storage repository 150 based on the unique identifier and metadata referencing the unique identifier in content management repository 140. The content management system may determine that an inconsistency exists in the content management system if content associated with the unique identifier is not referenced in the content management system (i.e., the content management system does not find content matching a name derived from the content identifier, finds a partial document (indicating a failed file upload), or finds matching content but does not find metadata associated with the unique identifier). If the content management system determines that there is an inconsistency between content storage repository 150 and content management repository 140, the content management system proceeds to step 540 to remove the inconsistency from the content management system. At step 540, the content management system removes content entries associated with the content identifier from the content management system.

If the content management system finds matching content in content storage repository 150 based on the content identifier and a metadata entry associated with the content identifier in content management repository 140, the content management system determines that no clean-up operations are to be performed for the content identifier. The content management system may proceed to process the next content identifier in an expired set of content identifiers or wait to process the next expired set of content identifiers.

Figure 6:
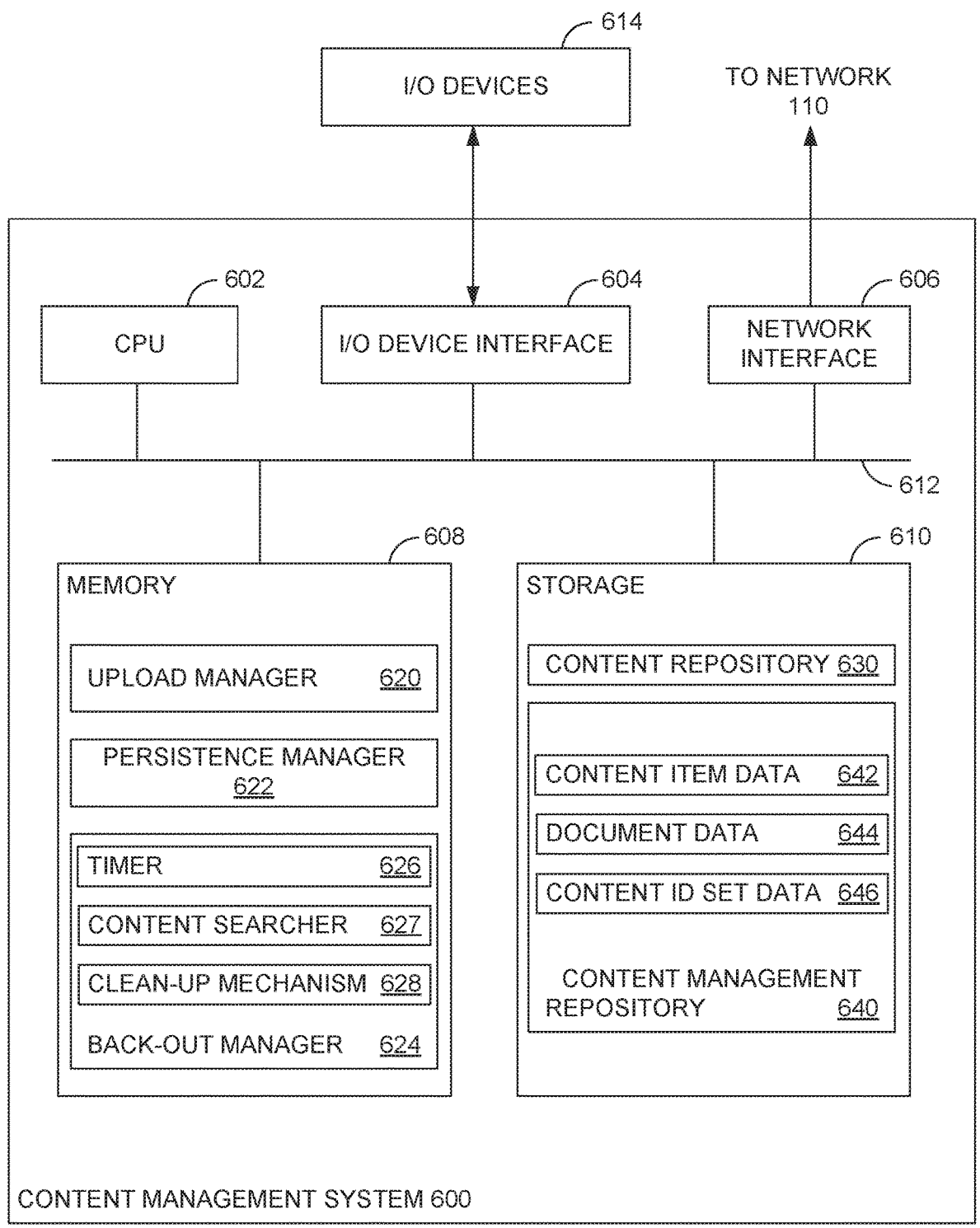
FIG. 6 illustrates an example content management system that uses associations between content, content identifiers, and content metadata to maintain consistency in the content management system, according to an embodiment.

FIG. 6 illustrates an example content management system 600 that uses temporary sets of content identifiers and a back-out procedure to maintain consistency in the content management system, according to an embodiment. As shown, the content management system 600 includes, without limitation, a central processing unit 602, one or more I/O device interfaces 904, which may allow for the connection of various I/O devices 614 (e.g., keyboards, displays, mouse devices, pen input, etc.) to the content management system 600, network interface 606, a memory 608, storage 610, and an interconnect 612.

CPU 602 may retrieve and execute programming instructions stored in the memory 608. Similarly, the CPU 602 may retrieve and store application residing in the memory 608. The interconnect 612 transmits programming instructions and application data among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes an upload manager 620, a persistence manager 622, and a back-out manager 624. Storage 610 includes a content repository 630 and a content management repository 640. As discussed above, upload manager 620 may be configured to receive requests to add, modify, or delete content stored in the content management system from one or more client devices 120 over network 110 (via network interface 606). Upload manager 620 may receive uploaded content from a client device 120 over network 110 and store the uploaded content in storage 610 (e.g., in content repository 630). Persistence manager 622 may be configured to persist document metadata to storage 610 (e.g., in content management repository 140) after upload manager 620 stores the uploaded content in storage 610.

Back-out manager 624, as discussed above, may include a timer 626, a content searcher 627, and a clean-up mechanism 628. The back-out manager may use timer 626 to determine when the back-out manager should examine a set of content identifiers generated and potentially used by the content management system. Expiry of timer 626 may trigger content searcher 627 to examine a set of expired content identifiers. As discussed above, content searcher 627 may determine whether or not the content management system allocated a content identifier for content upload processes. If content searcher 627 determines that the content identifier was not allocated, the content searcher may delete the content identifier. If content searcher 627 determines that the content identifier was allocated for a content upload process, content searcher may search for matching content and document metadata associated with the content identifier in storage 610 (e.g., in content repository 630 and content management repository 640, respectively). If content searcher 627 finds an inconsistency between content and document metadata, clean-up mechanism 628 may delete the content identifier and any content associated with the content identifier from storage 610 (e.g., from content management repository 640 and content repository 630, respectively).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the information quality management system components) or related data available in the cloud. For example, the content management system could execute on a computing system in the cloud and generate sets of unique identifiers, associate identifiers with content during document upload processes, and perform back-out operations on content managed by the content management system. Doing so allows a user to add, modify, and/or delete content from a content management system from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for maintaining consistency in a content management system, comprising:
    associating a content item with a unique content identifier;
    generating a content name for the content item from the unique content identifier; and
    upon determining that the content item has been successfully stored in a non-transactional data repository, storing metadata related to the content item in a transactional data repository, wherein the metadata includes at least the unique content identifier associated with the content item.

2. The method of claim 1, wherein:
    the unique content identifier is in a set of content identifiers; and
    each content identifier in the set of content identifiers is assigned a common expiration time.

3. The method of claim 2, further comprising:
    determining, for each content identifier in the set of content identifiers, whether the content identifier is associated with any metadata in the transactional data repository.

4. The method of claim 3, further comprising:
    upon determining that the content identifier is not associated with any metadata in the transactional data repository, removing the content identifier from the set of content identifiers.

5. The method of claim 3, further comprising:
    upon determining that the content identifier is not associated with any metadata in the transactional data repository:
        determining a second content name based on the content identifier; and
        deleting a content item having the determined second content name from the non-transactional data repository.

6. The method of claim 3, further comprising:
    setting a lease time identifying an earliest time that other instances of the content management system can process content storage operations using the set of content identifiers.

7. The method of claim 2, wherein the set of content identifiers is stored in the transactional data repository.

* * * * *